(12) United States Patent  (10) Patent No.: US 7,788,537 B1
Yellen et al.  (45) Date of Patent: Aug. 31, 2010

(54) TECHNIQUES FOR COLLECTING CRITICAL INFORMATION FROM A MEMORY DUMP

(75) Inventors: Matthew Yellen, Worcester, MA (US); Michael W. Hamel, Milford, MA (US)

(73) Assignee: EMC Corporation, Hopkinton, MA (US)

( * ) Notice: Subject to any disclaimer, the term of this patent is extended or adjusted under 35 U.S.C. 154(b) by 1188 days.

(21) Appl. No.: 11/372,651

(22) Filed: Mar. 10, 2006

Related U.S. Application Data

(60) Provisional application No. 60/763,691, filed on Jan. 31, 2006.

(51) Int. Cl.
G06F 11/00 (2006.01)
(52) U.S. Cl. ......................................................... 714/38
(58) Field of Classification Search ..................... 714/38
See application file for complete search history.

(56) References Cited

U.S. PATENT DOCUMENTS

| | | | |
|---|---|---|---|
| 5,768,496 A * | 6/1998 | Lidgett et al. ................. 714/25 |
| 6,279,120 B1 * | 8/2001 | Lautenbach-Lampe et al. ............................ 714/15 |
| 6,502,208 B1 * | 12/2002 | McLaughlin et al. .......... 714/25 |
| 6,728,907 B1 * | 4/2004 | Wang et al. .................... 714/47 |
| 6,769,077 B2 * | 7/2004 | Vachon et al. ................. 714/43 |
| 6,952,793 B2 * | 10/2005 | Nagasuka et al. ............... 714/5 |
| 7,171,593 B1 * | 1/2007 | Whittaker et al. ............. 714/57 |
| 7,308,609 B2 * | 12/2007 | Dickenson et al. ............ 714/36 |
| 2005/0081115 A1 * | 4/2005 | Cheng et al. ................... 714/47 |
| 2005/0154938 A1 * | 7/2005 | McLamb et al. ............... 714/17 |
| 2006/0041739 A1 * | 2/2006 | Iwakura et al. .................. 713/2 |
| 2007/0245170 A1 * | 10/2007 | Crowell et al. ................ 714/36 |
| 2009/0044051 A1 * | 2/2009 | Nellitheertha ................. 714/19 |

* cited by examiner

Primary Examiner—Bryce P Bonzo
(74) Attorney, Agent, or Firm—Muirhead and Saturnelli, LLC (57) ABSTRACT

Described are techniques for processing a memory dump file. It is determined whether a memory dump file associated with a previous processor failure exists. In response to determining that the memory dump file exists, preliminary analysis of the memory dump file is performed. The determining step and the preliminary analysis are performed as part of rebooting a processor from the previous failure of the processor.

20 Claims, 8 Drawing Sheets

TECHNIQUES FOR COLLECTING CRITICAL INFORMATION FROM A MEMORY DUMP

CROSS REFERENCE TO RELATED APPLICATIONS

This application claims priority to U.S. Provisional Patent Application No. 60/763,691 filed on Jan. 31, 2006, entitled "TECHNIQUES FOR COLLECTING CRITICAL INFORMATION FROM A MEMORY DUMP", which is incorporated by reference herein.

BACKGROUND

1. Technical Field

This application generally relates to computer processors, and more particularly to techniques used in connection with analyzing the contents of memory at the time of a processor failure.

2. Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems, also referred to as server systems, may store and retrieve data using a storage device containing a plurality of host interface units, disk drives, and disk interface units. The host systems access the storage device through a plurality of channels provided therewith. Host systems provide data and access control information through the channels to the storage device and storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data stored therein.

When a storage processor included in the data storage system fails, a complete memory dump may be generated. The memory dump may include the contents of the memory in the form of a memory dump file. The memory dump file is typically a very large file that may be used in connection with determining the cause of the failure. The data storage system may be physically located in an area with limited network connectivity and the memory dump file may need to be sent to an external or offsite location in connection with performing the analysis. Obtaining a copy of the memory dump file from the failure site may take an unacceptable amount of time due to the limited network connectivity with the failure site often extending the amount of time before any diagnosis of the failure may be rendered. Thus, it may be desirable to utilize an alternative technique to transmission of the large memory dump file offsite for further analysis.

SUMMARY OF THE INVENTION

In accordance with one aspect of the invention is a method for processing a memory dump file comprising: determining whether a memory dump file associated with a previous processor failure exists; and in response to determining that the memory dump file exists, performing preliminary analysis of said memory dump file, and wherein said determining and said preliminary analysis are performed as part of rebooting a processor from the previous failure of the processor. The performing preliminary analysis may also include storing the extracted information in a file having a human-readable form in which the file has a size which is smaller than said memory dump file. The processor may be included in a data storage system. The processor may be one of a plurality of processors included in a data storage system, said plurality of processors including a first primary processor and a second processor which acts as a failover processor in the event that said first primary processor is offline, and wherein said processor is said first primary processor performing said rebooting. The second processor may service data requests while said first primary processor is performing said rebooting in response to a failure of said first primary processor. The preliminary analysis may include: extracting a common set of information from said memory dump file; and storing said common set of information in a preliminary analysis file. The preliminary analysis may also include: performing conditional processing using said common set of information extracted; extracting conditional processing output from said memory dump file in accordance with said conditional processing; and storing said conditional processing output in said preliminary analysis file. The preliminary analysis may be performed using a debugger executing a script, said script including calls to routines in a library, said calls being used to parse and interpret information included in said memory dump file. The common set of information may include a first portion obtained by making one or more calls to routines in a first standard library provided with said debugger, and a second portion obtained by making one or more calls to routines in a customized library. The customized library may include routines for interpreting data structures in accordance with a customized data format. The data structures may describe entities and a state of said entities at a time of said previous failure of said processor. At least one of said entities may be one of a physical or logical device of a data storage system including said processor. The method may also include performing subsequent analysis using information extracted from said memory dump file in accordance with said preliminary analysis, said subsequent analysis including performing diagnostic processing to identify potential causes of said previous failure in accordance with diagnostic signature information. At least one of said conditional processing and said subsequent analysis may be performed in accordance with a configuration option setting.

In accordance with another aspect of the invention is a data storage system comprising: a processor that executes instructions; a debugger that executes at least one script for analyzing a memory dump file from a previous failure of the processor and generating a preliminary analysis file; a dump manager that controls processing for analyzing the memory dump file from a previous failure of the processor, said dump manager invoking said debugger in connection with said analyzing; a boot module including code executed to boot said processor, wherein said boot module automatically invokes said dump manager as part of booting said processor; and at least routine including code used to extract and interpret information from said memory dump file, said at least one routine being invoked by said debugger in accordance with said at least one script. Execution of a script by said debugger may perform subsequent analysis in accordance with diagnostic signature information including profile information about known problems. The data storage system may also include a compression module that compresses said preliminary analysis file, said compression module being invoked by said dump manager. The dump manager, said boot module, said at least one script, said at least one routine, and said dump manager may be included in a same partition of storage of said data storage system.

In accordance with another aspect of the invention is a computer-readable medium storing instructions thereon for performing a method for processing a memory dump file comprising: determining whether a memory dump file associated with a previous processor failure exists; and in response to determining that the memory dump file exists, performing preliminary analysis of said memory dump file, and wherein said determining and said preliminary analysis are performed as part of rebooting a processor from the previous failure of the processor. The performing preliminary analysis may further include: storing the extracted information in a file having a human-readable form, said file having a size which is smaller than said memory dump file.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
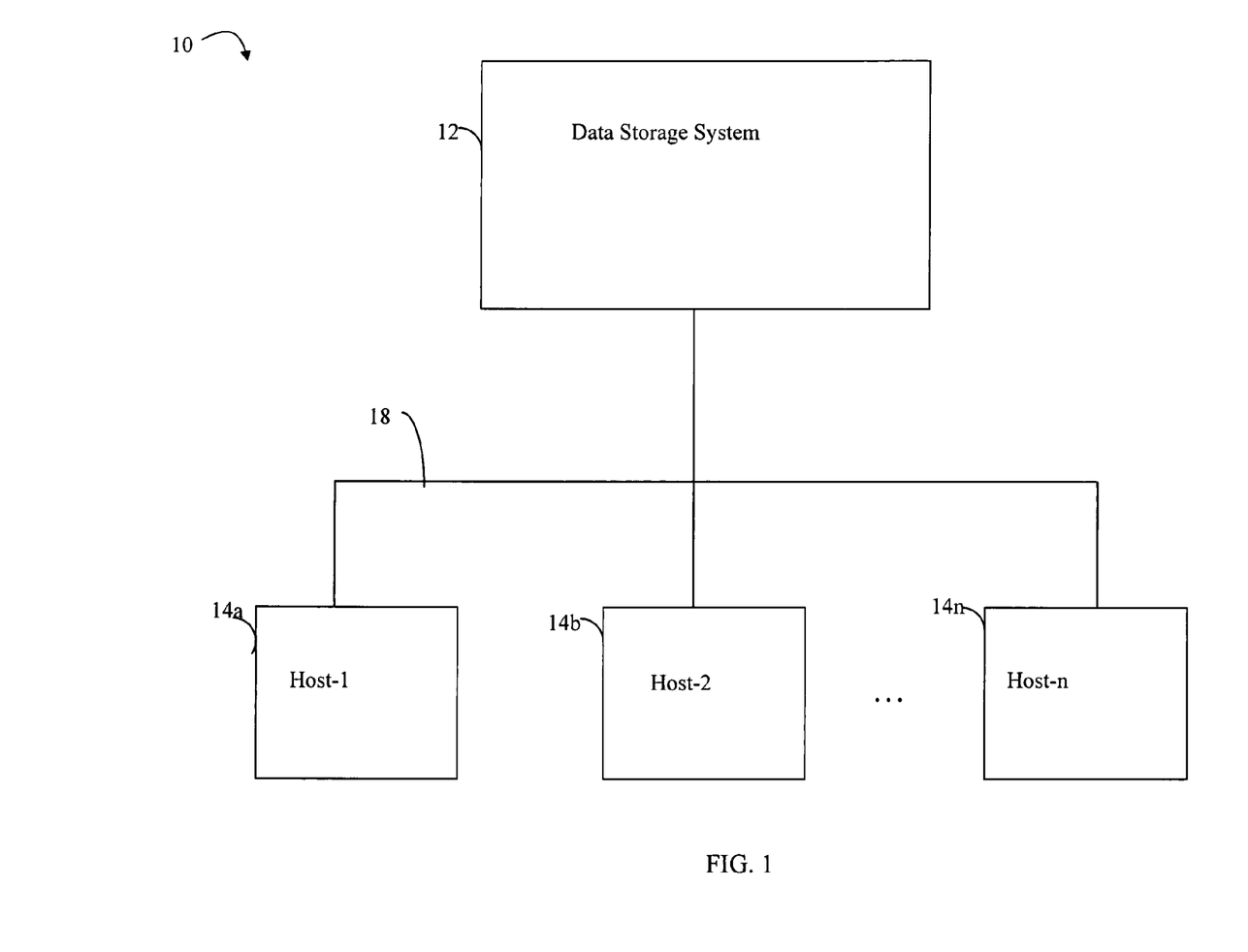
FIG. 1 is an example of an embodiment of a computer system that may utilize the techniques described herein.

Referring now to FIG. 1, shown is an example of an embodiment of a computer system that may be used in connection with performing the techniques described herein. The computer system 10 includes a data storage system 12 connected to host systems 14a-14n through communication medium 18. In this embodiment of the computer system 10, and the N hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the data storage system 12, and may also communicate with others included in the computer system 10.

Each of the host systems 14a-14n and the data storage system 12 included in the computer system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage system 12 are described herein in more detail, and may vary with each particular embodiment. Each of the host computers 14a-14n and data storage system may all be located at the same physical site, or, alternatively, may also be located in different physical locations. Examples of the communication medium that may be used to provide the different types of connections between the host computer systems and the data storage system of the computer system 10 may use a variety of different communication protocols such as SCSI, Fibre Channel, iSCSI, and the like. Some or all of the connections by which the hosts, management component(s), and data storage system may be connected to the communication medium may pass through other communication devices, such as a Connectrix or other switching equipment that may exist such as a phone line, a repeater, a multiplexer or even a satellite.

Each of the host computer systems may perform different types of data operations in accordance with different types of tasks. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12.

An embodiment of the data storage system 12 may include one or more data storage systems. Each of the data storage systems may include one or more data storage devices, such as disks. One or more data storage systems may be manufactured by one or more different vendors. Each of the data storage systems included in 12 may be inter-connected (not shown). Additionally, the data storage systems may also be connected to the host systems through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage systems 12.

It should be noted that each of the data storage systems may operate stand-alone, or may also included as part of a storage area network (SAN) that includes, for example, other components such as other data storage systems Each of the data storage systems of element 12 may include a plurality of physical disk devices or physical volumes. The particular data storage systems and examples as described herein for purposes of illustration should not be construed as a limitation. Other types of commercially available data storage systems, as well as processors and hardware controlling access to these particular devices, may also be included in an embodiment.

Servers or host systems, such as 14a-14n, provide data and access control information through channels to the storage systems, and the storage systems may also provide data to the host systems also through the channels. The host systems do not address the disk drives of the storage systems directly, but rather access to data may be provided to one or more host systems from what the host systems view as a plurality of logical devices or logical units. The logical units may or may not correspond to the actual disk drives. For example, one or more logical units may reside on a single physical disk drive. Data in a single storage system may be accessed by multiple hosts allowing the hosts to share the data residing therein. A LUN (logical unit number) may be used to refer to one of the foregoing logically defined units.

Figure 2:
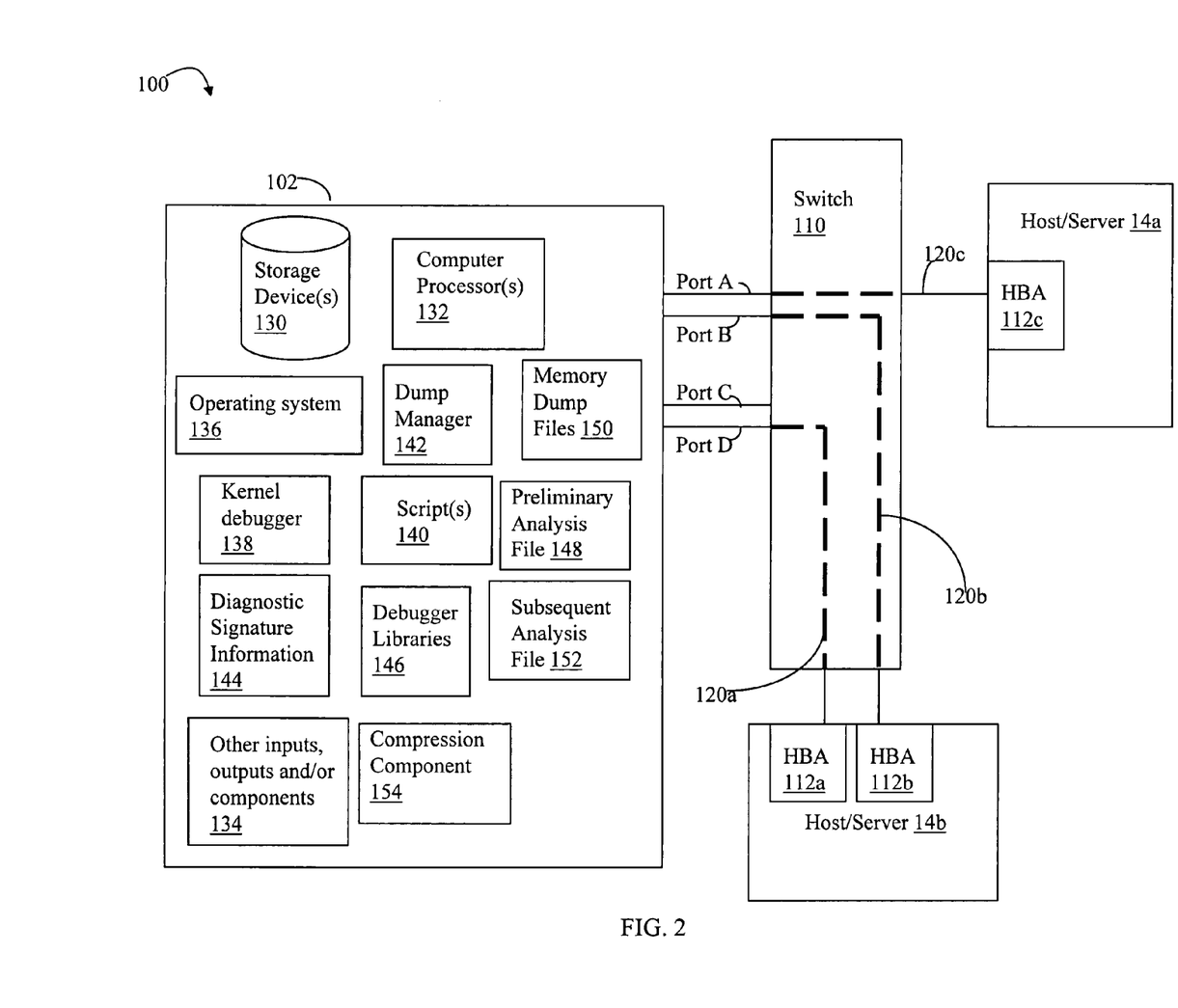
FIG. 2 illustrates in more detail components that may be included in an embodiment of the system of FIG. 1.

Referring now to FIG. 2, shown is an example 100 of components that may be used in connection with techniques described herein. The example 100 may represent components illustrated in connection of FIG. 1 configured in a storage area network (SAN). Included in the example 100 is a data storage system 102, a switch 110, and hosts or servers 14a and 14b. The switch 110 may be used in connection with facilitating communications between each of the hosts 14a and 14b and the data storage system 102. Communications between a host and the data storage system 102 may be defined in terms of a path. Host 14a communicates with the data storage system 102 over a path designated as 120c. Path 120c is formed by the starting point, the HBA or host bus adapter 112c and the ending point, port A of the receiving data storage system 102. Host 14b communicates with the data storage system 102 over two paths designated as 120a and 120b. Path 120a is formed by the starting point, the HBA 112a, and the ending point, port d of the receiving data storage system 102. Path 120b is formed by the starting point, the HBA 112b, and the ending point, port b of the receiving data storage system 102. It should be noted that different HBAs from the same or different hosts may also communicate with the data storage system through a same port of the data storage system although each path 112a, 112b, and 112c use a different port. An embodiment may represent a path using the WWN (world wide name) of a host's HBA and the WWN of a data storage system port receiving the request. As known to those skilled in the art, a WWN is a unique number assigned by a recognized naming authority that identifies a connection or a set of connections to the network. As also known to those skilled in the art, various networking technologies that may be used in an embodiment make use of WWNs. In connection with the techniques described herein, other embodiments may use other ways in defining a path that may vary with the connectivity in each embodiment.

Each HBA may include one or more ports although in the example illustrated, each HBA has only a single port. Additionally, although only a single data storage system is illustrated for purposes of simplicity in illustration, each of the hosts may have connections to more than one data storage system in the SAN. Additionally, each host may be connected to the data storage system 102 using other connections, including direct cabling, than as illustrated in FIG. 2.

The data storage system 102 is illustrated as including one or more storage devices 130, one or more computer processors 132, an operating system 136, a dump manager 142, one or more memory dump files 150, a kernel debugger 138, one or more scripts 140, a preliminary analysis file 148, diagnostic signature information 144, debugger libraries 146, a subsequent analysis file 152, a compression component 154, and other inputs, outputs and/or components 134.

An example of an embodiment of the data storage system 102 is the CLARiiON™ data storage system by EMC Corporation which includes two computer processors as represented by the element 132 although an embodiment may include a different number of processors for use in connection with the techniques described herein. In one embodiment, the data storage system 102 may include multiple processors configured to form a cluster. Only one of the processors is designated as active at any time with one or more of the other remaining processors designated as failover processors. Upon the failure of a currently active processor, a failover processor may become the active processor of the data storage system. An embodiment including the use of failover processors in connection with the techniques described herein is set forth in more detail in following paragraphs.

When one of the processors 132 included in the data storage system 102 fails, a complete memory dump may be automatically generated. For example, the processor may perform processing steps to commence shutdown upon the detection of a particular erroneous or corrupt state. Such a state may be detected by the operating system 136 executing on processor 132 of the data storage system 102. As part of these processing steps, the contents of the memory in the form of a memory dump may be generated and stored as a memory dump file 150 in the local file system on one of the devices 130 of the data storage system 102. The memory dump file 150 is typically a very large file and may be of a size, for example, which is hundreds of megabytes.

The memory dump file 150 may be analyzed in connection with determining the cause of the failure. The data storage system may be physically located in an area with limited network connectivity. The existing connectivity may utilize a relatively slow connection with limited bandwidth and/or availability. The memory dump file 150 may need to be sent to an external or offsite location in connection with performing the analysis. Obtaining a copy of the memory dump file from the failure site may take an unacceptable amount of time due to the limited available connectivity with the failure site often extending the amount of time before any diagnosis of the failure may be rendered.

The techniques described herein may be used in connection with performing an automated preliminary analysis of the memory dump file 150 on the data storage system 102 using one or more scripts 140 to generate the preliminary analysis file 148 and optionally the subsequent analysis file 152. The files 148 and 152, which include selected information extracted from the memory dump file 150, are generated using the techniques described herein and are typically much smaller in size than the file 150. Accordingly, the files 148 and 152 may be transmitted to the offsite location for further analysis rather than the memory dump file 150. It should be noted, as will be described herein, that an embodiment may also transmit compressed forms of the files 148 and/or 152.

The one or more storage devices 130 may represent one or more physical devices, such as disk drives, that may be accessed in logical units as described elsewhere herein. The operating system 136 may be any one of a variety of commercially available, proprietary, or other operating system capable of execution by the one or more computer processors 132 in accordance with the particulars of the data storage system 102. In one embodiment, the operating system 136 may be the Windows XP™ Embedded operating system by Microsoft Corporation. The kernel debugger 138 may be the console debugger, KD, suitable for execution on the particular operating system for kernel debugging. The one or more scripts 140 may be debugger scripts including commands performed by the kernel debugger 138 to extract selected information from the memory dump file 150 for inclusion in the preliminary analysis file 148. Additionally, subsequent analysis may be optionally performed on the preliminary analysis file 148 using one or more scripts 140 to produce a subsequent analysis file 152. The subsequent analysis may use information included in the diagnostic signature information file 144 in connection with further diagnosing the failure. The scripts 140 may include calls to routines in the debugger libraries 146. The compression component 154 may be used in connection with storing compressed versions of the various files 148 and 152. The preliminary analysis performed on the data storage system 102 may be controlled by the dump manager 142.

The other inputs, outputs, and/or components 134 may represent other hardware and/or software components that may be included in the data storage system 102. The element 134 may include software components such as, for example, management software for management of the data storage system, and the like. The element 134 may also include hardware components such as, for example, memory, other storage areas, and the like. The element 134 may also include other inputs and/or outputs such as command line inputs, configuration options, and the like, as described herein.

Techniques using the components illustrated in the example 100 are described in more detail in following paragraphs.

As mentioned above, a data storage system 102 with a failed processor 132 may be included in a site, such as a customer site, which is remotely located with respect to a location where further analysis of the memory dump file may be performed.

Figure 3:
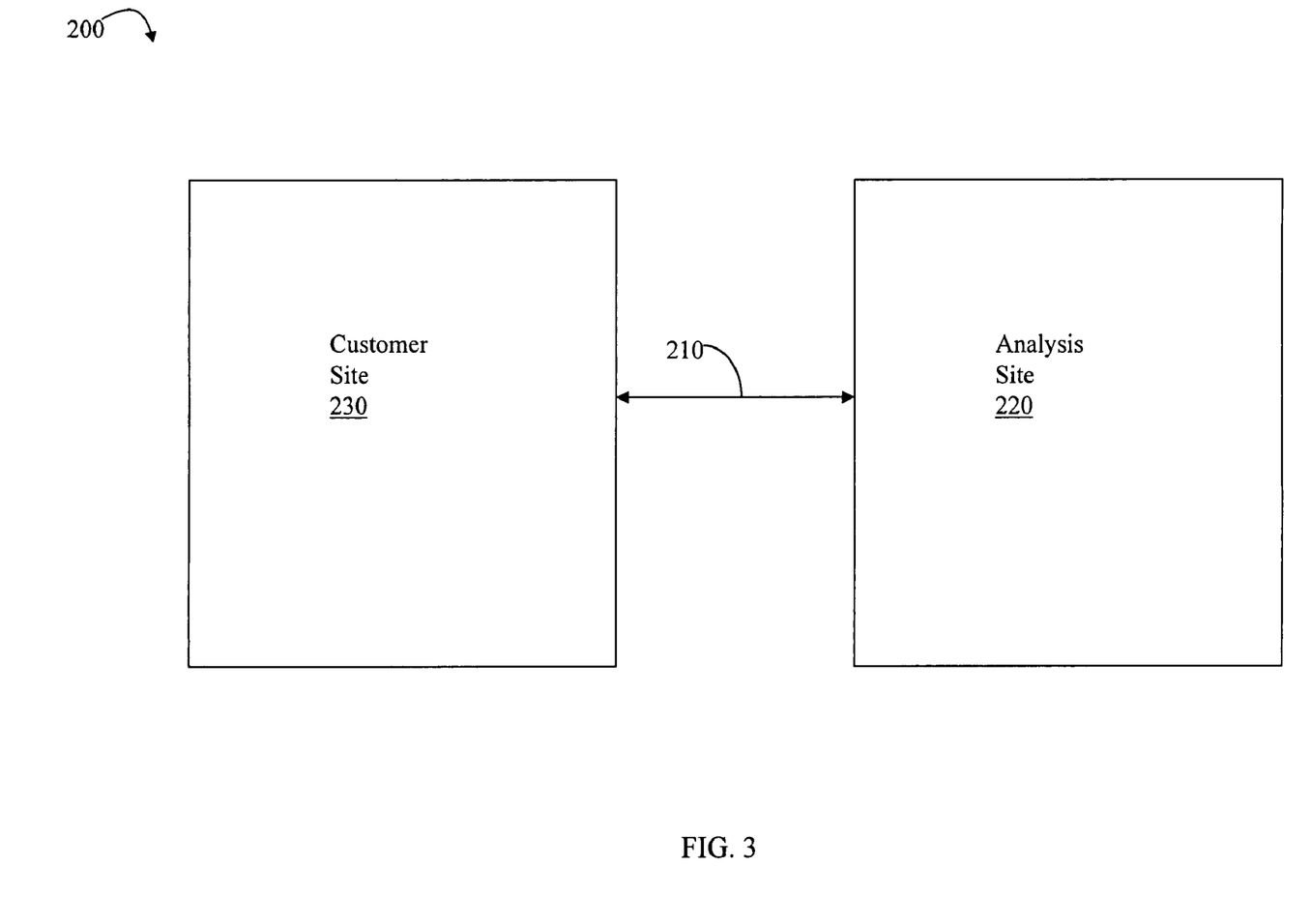
FIG. 3 is an example of a customer site and an analysis site in which the customer site may include the components from FIG. 2.

Referring now to FIG. 3, shown is an example 200 of a customer site 100 remotely located with respect to the analysis site 220. The customer site 230 may include the SAN arrangement and components as illustrated in FIG. 2. It should be noted that the customer site 230 may also include other components. When a processor of the data storage system at the site 230 fails, the customer may contact a technician to assist in problem diagnosis regarding the failure. The technician may be located at a remote analysis site 220 and may require information from the memory dump file 150 in performing a further analysis. Any data that is transmitted between the sites 230 and 220 may be transmitted over connection 210. As also described above, connection 210 may be characterized as a slow connection having limited bandwidth and/or connectivity. As such, problem analysis may be facilitated using the techniques described herein by performing preliminary analysis on the memory dump file to generate the preliminary analysis file 148 and optionally the subsequent analysis file 152. As described herein, the files 148 and 152 include selected information from the memory dump file which may be used by the technician or other individual in analyzing the failure associated with the memory dump file. The files 148 and 152 may be transmitted to the analysis site 220 from the customer site 230 with the processor failure in connection with further analyzing the processor failure.

FIG. 3 illustrates one particular example within which the components of FIG. 2 of the data storage system 102 may be included.

What will now be described in more detail are the components of FIG. 2 in connection with the techniques described herein to generate the preliminary analysis file 148 and optionally the subsequent analysis file 152.

Using the techniques described herein, the preliminary analysis of the memory dump file at the failure site may be automatically triggered when a processor of the data storage system reboots subsequent to the failure producing the memory dump file. For example, in one embodiment, the failure of a processor of the data storage system may result in generation of a memory dump file stored in a particular location on the data storage system. The memory dump file may be produced, for example, as part of shutdown processing performed in response to detecting an undesirable system state. Subsequently, the processor may reboot. As part of the reboot processing, a dump manager may determine if there is a memory dump file generated from a previous processor failure. If so, the dump manager may automatically perform processing for the preliminary analysis to produce a preliminary analysis file. The preliminary analysis file may be characterized as a smaller version of the memory dump file including critical information extracted from the larger memory dump file. As described above, the preliminary analysis file may be used in connection with performing an analysis and diagnosis of the failure rather than the memory dump file. Since the preliminary analysis file is typically much smaller than the memory dump file, the preliminary analysis file may be transmitted offsite for further analysis in less time than may otherwise be associated with the memory dump file offsite transmission.

In one embodiment, the dump manager may cause execution of a script to perform the preliminary analysis. As described above, execution of the script may be triggered automatically upon detection of an existing memory dump file from a previous processor failure. The script may be used in connection with parsing and extracting critical information from the memory dump file for inclusion in the preliminary analysis file. The particular information extracted for inclusion in the preliminary analysis file may vary in accordance with processing performed by the script. In other words, the script may perform conditional processing resulting in varying types and amount of information included in the preliminary analysis file in accordance with particular conditions detected during script execution. The preliminary analysis file may also include a common portion of information which is a same set of information for each script execution. In other words, the preliminary analysis file may include a portion which is independent of conditional processing performed by the script. For example, the script may always extract configuration information describing what physical and/or logical devices are defined, the call stack, and the like. As part of the conditional processing, the script may determine whether each device is in a particular state, such as rebuilding. If a device is in one of the particular states, additional more detailed information about the device may then be extracted from the memory dump file for inclusion into the preliminary analysis file by executing additional script commands. The particular states for which conditional processing may be performed to extract additional and/or more detailed information may vary with embodiment. An embodiment may also include a configurable option for enabling/disabling the conditional processing resulting in additional more detailed information being included in the preliminary analysis file.

In one embodiment, a kernel debugger may be used in connection with generation of the preliminary analysis file. Execution of the kernel debugger may be initiated by the dump manager as part of the processing performed automatically when a memory dump file for a processor is detected upon rebooting the processor. The script which is executed may be a kernel debugger script instructing the kernel debugger to extract selected information from the memory dump file. Additionally, an embodiment may utilize customized debugger extensions in connection with extracting and interpreting information from the memory dump file. The particular extensions that may be utilized may vary in accordance with the embodiment. In connection with the kernel debugger described herein, routines may be defined which interpret data included in the memory dump file. The debugger extensions may allow a user to define customized routines which may be used in connection with interpreting data from the memory dump file in accordance with a particular data structure format. The script may include commands to invoke the customized routines as well as any other defined routines that may be included in an API (application programming interface) provided for use with the kernel debugger. As an example use of the customized routines, proprietary data structures may be defined for configuration information of the data storage system. The script may include commands which invoke the customized routines when extracting and/or interpreting information from the memory dump file corresponding to the proprietary data structures for the configuration information.

An embodiment may perform subsequent analysis on the generated preliminary analysis file. The subsequent analysis may also be performed at the failure site and may attempt to identify whether the preliminary analysis file includes data corresponding to signature or profile information associated with a particular known problem. In other words, the preliminary analysis file may be analyzed to determine whether the latest processor failure currently under analysis includes symptoms corresponding to those of known problems. The subsequent analysis may be performed by commands included in a different script, or the same script as used to produce the preliminary analysis file. The signature or profile information associated with known problems may be empirically determined in accordance with analysis and problem diagnosis using one or more other memory dumps. The particular problems and associated signatures included in an embodiment may vary. The subsequent analysis may be optionally and automatically performed subsequent to the generation of the preliminary analysis file. In one embodiment, the dump manager may trigger execution of a second script to perform the subsequent analysis in accordance with a particular setting or configurable processing option. An output of the subsequent analysis may be what known problems, if any, have been identified in accordance with the current processor failure. The processing performed in the subsequent analysis may also vary in accordance with any additional information extracted as a result of conditional processing.

It should be noted that the particular problems identified in the subsequent analysis processing may be characterized as potential candidates for the cause of the failure and may not necessarily be the actual cause for the failure. It may be that multiple problems exhibit the same set of one or more symptoms and the output of this subsequent analysis may be used by a technician in connection with diagnosing the actual cause of the processor failure.

What will now be illustrated in more detail is the data flow and interaction between the components of FIG. 2.

Figure 4:
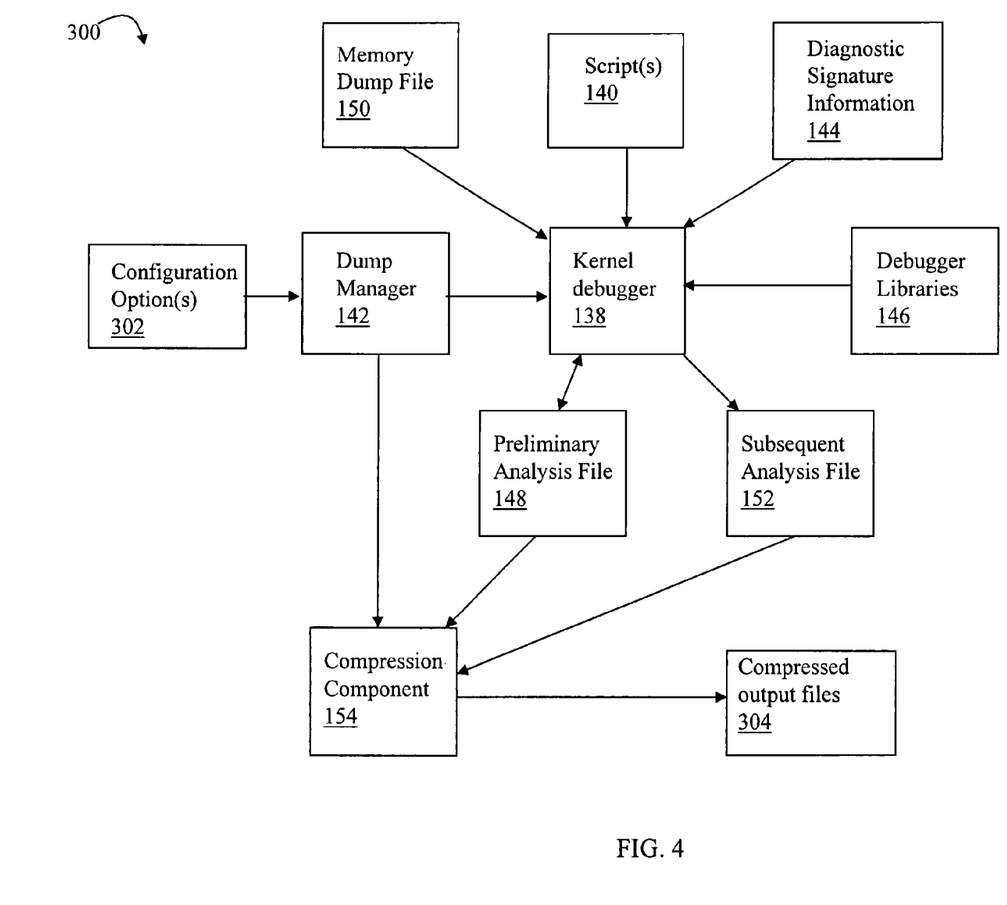
FIG. 4 illustrates the data flow an interaction of the components of FIG. 2 in connection with the techniques described herein.

Referring now to FIG. 4, shown is an example 300 illustrating the data flow and interaction between components of FIG. 2 in connection with the techniques described herein. The example 300 illustrates the components utilizing an existing memory dump file 150 as may be generated in connection with a previous failure of a processor. On a subsequent reboot of the processor, a determination is made as to whether there are any existing memory dump files indicating a previous failure. If so, processing steps are performed by the dump manager 142 to analyze the memory dump file 150 as part of the reboot processing. Any configuration options 302 may be communicated to the dump manager 142. As described elsewhere herein, the configuration options 302 may include settings enabling/disabling conditional processing and/or subsequent analysis options. The dump manager 142 invokes the kernel debugger 138. Execution of the kernel debugger 138 is controlled using one or more scripts 140 of debugger commands. The debugger 138 parses the memory dump file 150 in accordance with commands included in 140 to produce the preliminary analysis file 148. The commands included in 140 may utilize routines included in one or more debugger libraries 146. In one embodiment the component 146 may include one or more APIs included in a library. The component 146 may include libraries, as supplied with the operating system for use with the debugger 138, as well as a customized library, as may be produced using debugger extensions for interpreting data in the memory dump in accordance with proprietary data structures and layouts. As described herein, the preliminary analysis processing may include script commands to extract a fixed or common set of information as well as commands to perform conditional processing. The conditional processing may result in additional information being included in the preliminary analysis file 148 in accordance with certain criteria.

As an example of the criteria that may result in additional information being conditional included in the file 148, if a determination is made that certain logical or physical devices are in a particular state, such as rebuilding, when the dump file is generated, the script may conditionally execute commands to include additional information about the devices into the file 148. Another example of conditional processing may be to obtain additional status information for hot spare devices which are transitioning and/or in use. A hot spare device may be characterized as a secondary physical device which may come on line in the event that a primary physical device goes off line. The hot spare device may be in one of 4 states: transitioning in to function as the offline primary device, transitioning out when the primary device comes back on line, in use and functioning as the primary device, or characterized as inactive/not in use when the primary device is online. Additional information may be obtained about the hot spare device when in one of the first 3 states (e.g., transitioning in, transitioning out, swapped in and functioning as the primary device). As another example of conditional processing, when an invalid memory reference or access violation causes generation of the dump file 150, additional processing may be performed to include the contents of memory surrounding the bad pointer including the memory reference. The foregoing are some examples of the different types of conditional processing that may be performed in an embodiment.

Additionally, as described herein, an embodiment may include functionality for making the conditional processing configurable. In one embodiment, a boolean value may specified as a flag in which all conditional processing is enabled or disabled in accordance with the flag setting. An embodiment may also include a finer granularity of configuration option settings by including, for example, a bitmask of multiple flags, each flag being associated with a different type of conditional processing available in an embodiment. For example, an embodiment may include the foregoing 3 conditional processing options (e.g., rebuild device state, hot spare device state, and invalid memory access). A different bit flag may be associated with each one of these options allowing a user to perform conditional processing for none, or some combination of these options. Configuration options such as these and other described herein may be specified in a configuration file, as a command line or other input on invocation, and the like. Such configuration option settings may be specified in connection with element 302 and communicated to the dump manager 142 and any other components in connection with performing the techniques described herein.

In an embodiment, the conditional processing may be performed using commands included in the same script as those commands for obtaining a common set of information. It should be noted that the commands for conditional processing may also be included in a different script. An embodiment may perform conditional processing in a same pass over the memory dump file 150 as when obtaining a common set of information if the scripting language includes conditional command language such as if-then statements, and the like. For example, the common set of information obtained may include all configuration information and certain status information on all logical units. When acquiring the information on each device, the script may also conditionally obtain additional information in accordance with the device state and any conditional processing flag or configuration settings. Rather than perform conditional processing in the same pass as when obtaining the common set of information, an embodiment may alternatively obtain the common set of information and store it in the preliminary analysis file. Subsequently, the preliminary analysis file including the common set of information may be an input for use with a script for performing conditional processing. Any additional information extracted from the memory dump file 150 in accordance with conditional processing may be appended to the end of the preliminary analysis file, or otherwise included in particular location in the preliminary analysis file, such as with other information for a particular device.

Subsequent analysis may be performed on the preliminary analysis file 148. In one embodiment, the subsequent analysis may be configurable in accordance with varying levels of granularity as described above in connection with conditional processing. In other words, the subsequent analysis may include a single flag setting to enable/disable all subsequent analysis. An embodiment may also include a finer granularity of configuration using a bit mask with a flag for each type of subsequent analysis processing.

In one embodiment, the subsequent analysis processing may be performed using a script 140 instructing the debugger to process the preliminary analysis file 148 to attempt to identify one or more potential candidates which caused the processor failure. The candidates may be identified in accordance with diagnostic signature information 144 which includes signature or profile information symptomatic of associated problems. If the preliminary analysis file 148 includes particular symptoms that may be typically associated with one or more causes, the problem source may be identified and included in the subsequent analysis file 152. The script or other code portion for performing subsequent analysis may be automatically invoked after the preliminary analysis is complete. The file 144 may include one or more signatures that may vary with each embodiment. The file 144 may include signatures associated with, for example, program crashes, program hangs, other undesirable termination behavior errors indicative of corrupt binary files, hardware failures, and the like.

One example of a diagnosis that may be performed in connection with subsequent analysis processing related to inconsistent configuration information. Information for device and other component configurations may be stored in multiple locations such as on disk in one or more locations, in one or more memory locations, and the like. The diagnostic signature information file 144 may include "symptoms" or signature information identifying specific configuration inconsistencies. As one example, a database stored on a disk drive of a data storage system may include one or more tables of configuration information regarding configuration of the disks of the data storage system. For example, all disks included in a particular defined RAID grouping should have consistent configuration information as stored in the database. The configuration information may include rebuilding checkpoints for the LUNs bound in the RAID grouping. The information stored on the disk drive should also match a copy of the configuration information stored in memory while the data storage system was executing. If there is an inconsistency, for example, between the database copy and copy of configuration information in memory at the time of the system failure, this may be determined as a configuration inconsistency. If a particular configuration-related signature is detected, a diagnosis may be directly determined. Additionally, if particular configuration-related signature is detected, other information may be further extracted from the memory dump file and stored in the file 148 and/or 152.

Once subsequent analysis is complete, control may return to the dump manager 142 which may then invoke the compression component to compress files 148 and/or 152. In one embodiment, the compression component 154 may generate ZIP files or other compressed files 304 in accordance with other compression techniques and formats. The compression may be performed at predetermined time periods.

In one embodiment, a specified number of memory dump files and/or preliminary analysis files may be retained on the data storage system. The number of files retained may be configurable and vary with each embodiment. An embodiment may also perform trending or history analysis of the information included in one or more of the foregoing files. The compressed form of the files may be retained in addition to, or as an alternative to, the uncompressed versions.

As will be appreciated by those skilled in the art, components, such as the kernel debugger 138, may also utilize other inputs and/or outputs in operation not illustrated in FIG. 4. For example, symbol information may also be input to the debugger in connection with determining a memory location of a symbol.

The preliminary analysis file and/or the subsequent analysis file may be a human readable form such as a text file although other embodiments may use different types and formats.

In one embodiment, the components used in connection with the techniques described herein may be included in a boot partition in reserved storage space on a configured device of the data storage system.

Figure 5:
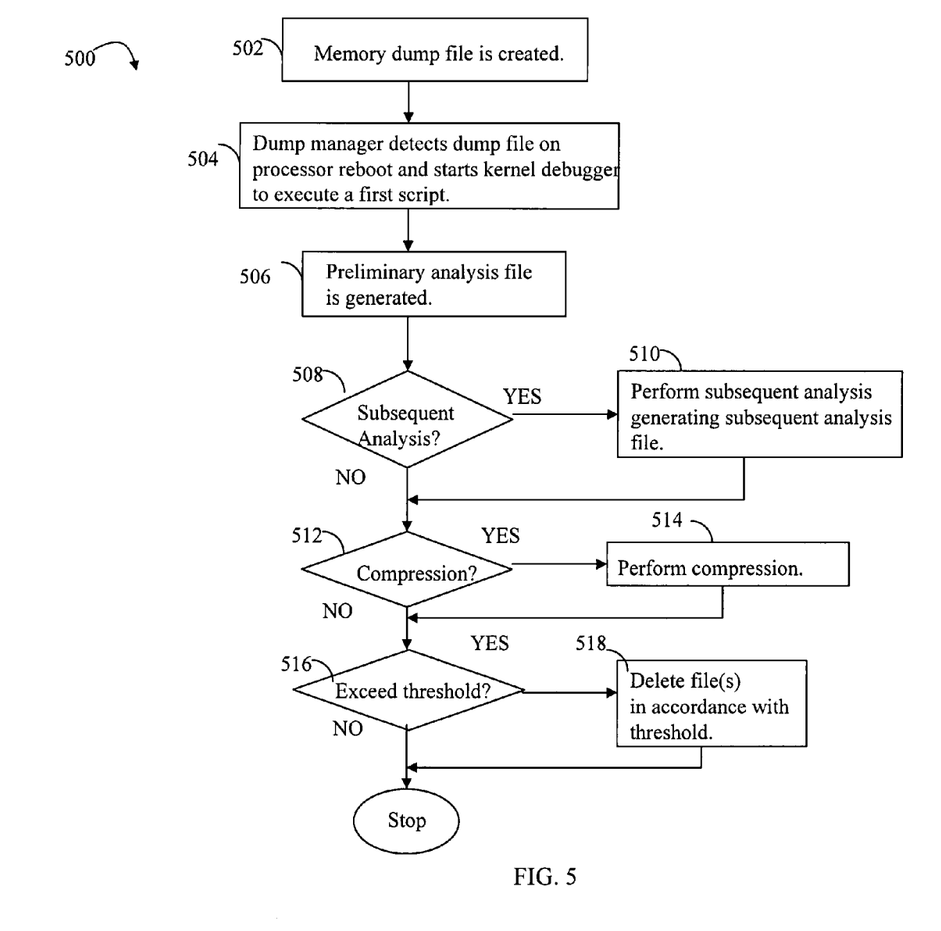
FIGS. 5 and 6 are flowcharts of processing steps that may be performed in an embodiment of a data storage system in connection with the techniques described herein.

Referring now to FIG. 5, shown is a flowchart of processing steps that may be performed by a data storage system in connection with the techniques described herein. The steps of FIG. 5 generally summarize processing just described. At step 502, a memory dump file is generated prior to the processor shutting down due to an erroneous or abnormal system state. As described herein, a variety of different conditions may cause a memory dump file to be generated. The operating system may detect an erroneous or abnormal state and cause termination processing including generation of a memory dump file. Such states may include generation of an exception state for an invalid memory access, system "hangs", and the like. Subsequently, the processor reboots. As part of the reboot processing at step 504, the dump manager is invoked and performs processing to determine whether any newly created memory dump files exist. As part of step 504 processing, the dump manager starts to kernel debugger to execute a first script. At step 506, the preliminary analysis file is generated as a result of executing the script in step 504. Step 506 processing may include generation of the common set of information as described elsewhere herein as well as any conditional processing to be performed. Whether conditional processing is performed may be in accordance with one or more configuration options. At step 508, a determination is made as to whether subsequent analysis is to be performed. As described herein, subsequent analysis may be optionally included in an embodiment and may also be performed in accordance with one or more configuration options. If step 508 determines that subsequent analysis is to be performed, control proceeds to step 510. At step 510, the subsequent analysis is performed and the subsequent analysis file is generated. Control proceeds to step 512. If step 508 evaluates to no, control proceeds directly to step 512. At step 512, a determination is made as to whether compression is to be performed. Whether compression is performed may also be optionally included in an embodiment as well as in accordance with a configuration option. The configuration option related to compression may include, for example, an option to enable/disable compression, perform one of a selected set of supported compression techniques, and the like. If step 512 evaluates to yes, control proceeds to step 514 to perform compression. Control then proceeds to step 516. If step 512 evaluates to no, control proceeds directly to step 516. At step 516, a determination is made as to whether a number of existing copies of the preliminary analysis file and/or subsequent analysis file exceed a specified threshold number of files. The threshold number may be specified as a configurable option, for example, via a registry setting, in a configuration file, and the like, as also described elsewhere herein in connection with other options. If no threshold number is defined, a default threshold value may be used. Alternatively, an embodiment may not utilize any threshold value if no threshold number is defined. If step 516 evaluates to no, processing stops. If step 516 evaluates to yes and it is determined that the threshold number of files has been exceeded, control proceeds to step 518. At step 518, processing may be performed to delete the oldest one or more files so that no more than the threshold number of files remain after completion of step 518. Processing stops after step 518.

Figure 6:
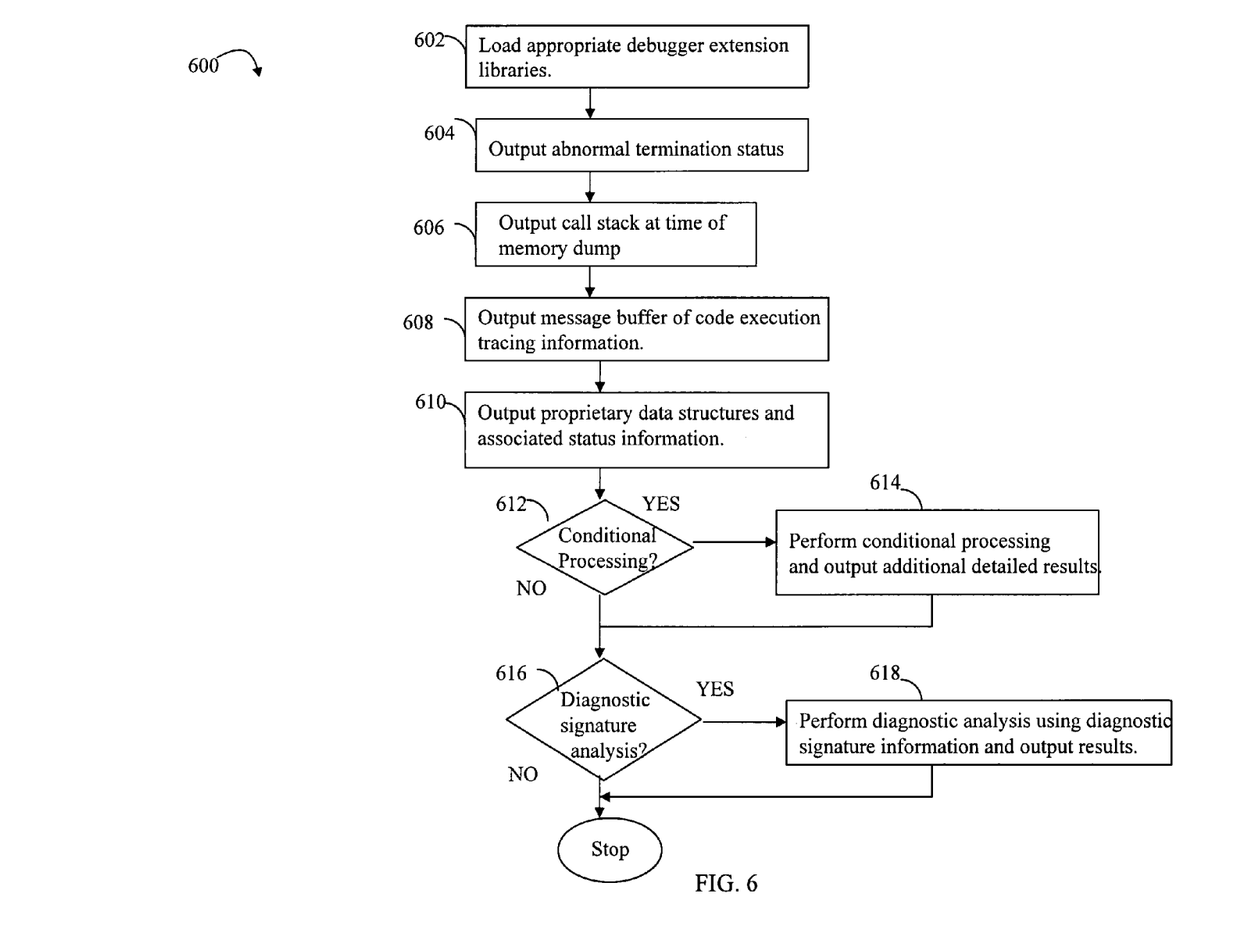

Referring now to FIG. 6, shown is a flowchart of processing steps that may be performed in connection with the preliminary analysis and subsequent analysis. The steps of flowchart 600 set forth more detailed processing of steps 508 and 510 of FIG. 5. At step 602, the debugger extension libraries, if any, may be loaded. In steps 604, 606, 608, and 610, the kernel debugger performs processing to parse the memory dump file. The memory dump file may be parsed by making calls to routines included in debugger extension libraries as well as standard libraries that may be shipped with the operating system or embodiment of the kernel debugger. As described herein, a common set of information may be extracted from a memory dump file. A first portion of the common set of information may be extracted using standard debugger routines. The routines know at what particular location a specific structure is located in the memory dump and subsequently interprets the data therein. A second portion of the common set of information may be extracted using debugger extension routines since such information may be of a customized format in accordance with customized data structures. The customized routines may be invoked in connection with extraction and/or interpretation of the customized data structures. The information extracted at steps 604 and 606 may be included in the first portion and the information extracted at steps 608 and 610 may be included in the second portion. At step 604, the abnormal termination status as detected in connection with the previous failure is extracted from the memory dump file and output to the preliminary analysis file. As described herein, such status may include, for example, a memory access violation. At step 606, the call stack is extracted and output to the preliminary analysis file. As known to those skilled in the art, the call stack represents information regarding which calls are active at the time of the memory dump. At step 608, a message buffer of code execution tracing information is extracted and included in the preliminary analysis file. In one embodiment, the tracing information may include values of parameters of various calls. Such tracing information may be stored in the buffer during execution of a portion of code, such as code executed by the data storage system in connection with performing various operations to service received requests. The tracing information may be useful in connection with problem diagnosis. At step 610, any one or more proprietary data structures may be output along with a portion of status information. The information output at step 610 may vary in accordance with embodiment. As one example, the configuration data structures of the various physical and logical devices of the data storage system may be output along with an associated status.

At step 612, a determination is made as to whether conditional processing is performed. Conditional processing may be included in the preliminary analysis phase and is described in more detail elsewhere herein. Conditional processing may be performed in accordance with the results obtained from one or more of steps 604, 606, 608 and 610. If step 612 evaluates to yes, control proceeds to step 614 to perform the conditional analysis in accordance with the script and output any additional information to the preliminary analysis file. Control proceeds to step 616. If step 612 evaluates to no, control proceeds directly to step 616. At step 616, a determination is made as to whether diagnostic signature analysis is performed. As described herein, diagnostic signature analysis is one type of subsequent analysis that may be optionally performed. Other embodiments may perform other processing in connection with the subsequent analysis phase using the preliminary analysis file. If step 616 evaluates to no, processing stops. If step 616 evaluates to yes, control proceeds to step 618 to perform the diagnostic analysis. Processing then stops.

The preliminary analysis file, and the results of any of the foregoing subsequent analysis, may be transmitted offsite for use in problem analysis. The data which is transmitted may be in the compressed form.

An embodiment of a data storage system may include multiple processors. As such, when one of the processors fails, the data storage system may continue to function and service I/O requests using another one of the multiple processors. Each processor may execute independently of the other processors in accordance with the techniques described herein. Each processor may be able to reboot independently of the other processors. Each processor may also have its own instance of the dump manager and its own set of one or more memory dump files. For example, when a first processor fails and a second processor acts as a failover processor to service any I/O requests, rebooting of the first processor may begin. An instance of the dump manager and other processing of the memory dump file as described herein may be performed by the subsequently rebooted first processor while the second processor performs tasks in connection with servicing I/O requests.

Figure 7:
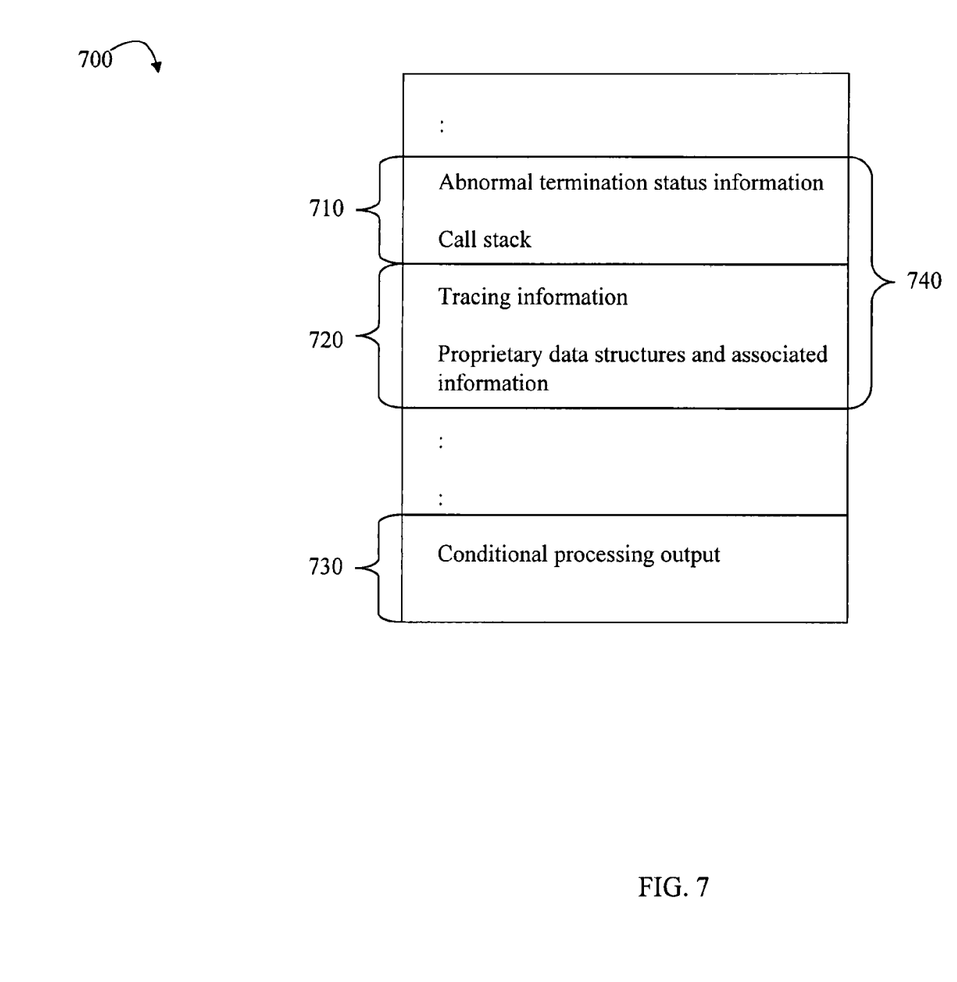
FIG. 7 is an example of an embodiment of a preliminary analysis file.

Referring now to FIG. 7, shown is an example of an embodiment of a preliminary analysis file. The example 700 includes a common set of information 740. An instance of the common set of information may be included in each preliminary analysis file. The common set of information may include two portions 710 and 720. The portion 710 may be the first portion described elsewhere herein in which the information is extracted and interpreted using standard debugger library routines. The portion 720 may be extracted and interpreted using debugger extensions for customized information included in the memory dump file. The example 700 also includes conditional processing output 730 which is included at the end of the file 700 although an embodiment may store conditional processing output elsewhere in the file. The preliminary analysis file may include other information than as described herein.

Figure 8:
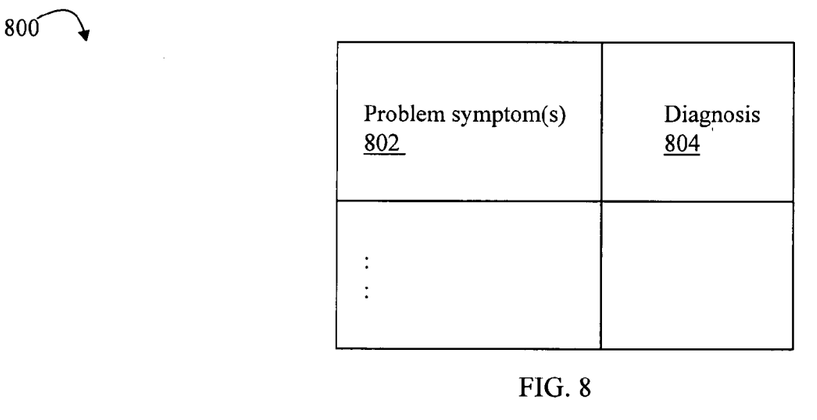
FIG. 8 is an example of an embodiment of a diagnostic signature information file.

Referring now to FIG. 8, shown is an example of an embodiment of a diagnostic signature information file as may be used in connection with performing subsequent analysis processing. The example 800 includes one or more sets of data. Each set of data may correspond to a row in the table of the example 800. Each set of data corresponds to a signature or profile which includes one or more problem symptoms 802 and a diagnosis 804. During subsequent analysis processing, a search of the preliminary analysis file may be performed to see if the symptoms 802 are found. If so, the corresponding diagnosis in 804 may be a candidate selected as a possible cause related to the processor failure. The diagnosis 804 and other information may be included in the subsequent analysis file.

Figure 9:
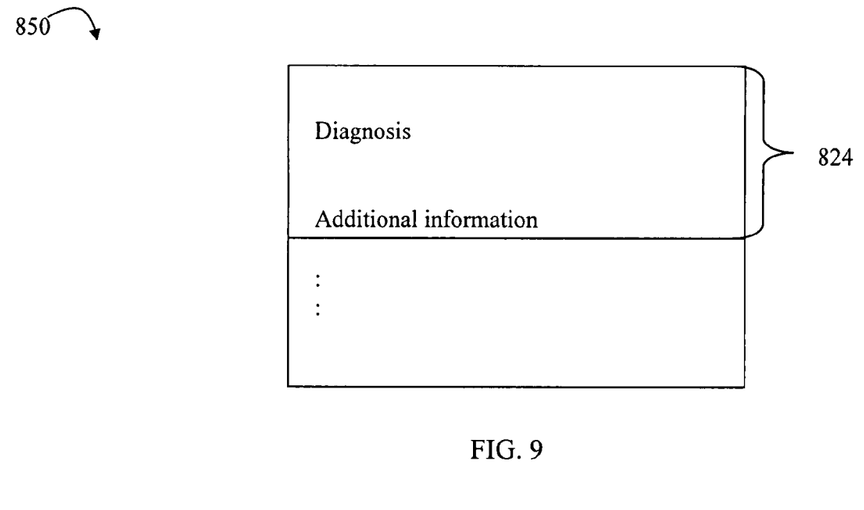
FIG. 9 is an example of an embodiment of a subsequent analysis file.

Referring now to FIG. 9, shown is an example of information that may be included in the subsequent analysis file. The example 850 includes diagnosis and additional information 824. The example 850 may include a portion 850 for each diagnosis. The additional information may include data extracted from the memory dump file in response to determining a particular diagnosis. For example, additional information about a device may be extracted from the memory dump file in the event that the subsequent analysis processing determines that the memory dump file includes the symptoms indicating a potential problem with the device. The additional information may be extracted using one or more routines from a standard debugger library and/or debugger extension or customized library.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for processing a memory dump file comprising:
   determining whether a memory dump file associated with a previous processor failure exists and
   in response to determining that the memory dump file exists, performing preliminary analysis of said memory dump file using a debugger, and
   wherein said determining and said preliminary analysis are performed as part of rebooting a processor from the previous failure of the processor.

2. A method for processing a memory dump file comprising:
   determining whether a memory dump file associated with a previous processor failure exists; and
   in response to determining that the memory dump file exists, performing preliminary analysis of said memory dump file, and
   wherein said determining and said preliminary analysis are performed as part of rebooting a processor from the previous failure of the processor, and
   wherein said performing preliminary analysis further includes:
   storing extracted information in a file having a human-readable form, said file having a size which is smaller than said memory dump file.

3. A method for processing a memory dump file comprising:
   determining whether a memory dump file associated with a previous processor failure exists; and
   in response to determining that the memory dump file exists, performing preliminary analysis of said memory dump file, and
   wherein said determining and said preliminary analysis are performed as part of rebooting a processor from the previous failure of the processor and wherein said processor is included in a data storage system.

4. A method for processing a memory dump file comprising:
   determining whether a memory dump file associated with a previous processor failure exists; and
   in response to determining that the memory dump file exists, performing preliminary analysis of said memory dump file, and
   wherein said determining and said preliminary analysis are performed as part of rebooting a processor from the previous failure of the processor and wherein said processor is one of a plurality of processors included in a data storage system, said plurality of processors including a first primary processor and a second processor which acts as a failover processor in the event that said first primary processor is offline, and wherein said processor is said first primary processor performing said rebooting.

5. The method of claim 4, wherein said second processor services data requests while said first primary processor is performing said rebooting in response to a failure of said first primary processor.

6. A method for processing a memory dump file comprising:
   determining whether a memory dump file associated with a previous processor failure exists; and
   in response to determining that the memory dump file exists, performing preliminary analysis of said memory dump file, and
   wherein said determining and said preliminary analysis are performed as part of rebooting a processor from the previous failure of the processor, and wherein said preliminary analysis includes:
   extracting a common set of information from said memory dump file; and
   storing said common set of information in a preliminary analysis file.

7. The method of claim 6, wherein said preliminary analysis includes:
   performing conditional processing using said common set of information extracted;
   extracting conditional processing output from said memory dump file in accordance with said conditional processing; and
   storing said conditional processing output in said preliminary analysis file.

8. The method of claim 6, wherein said preliminary analysis is performed using a debugger executing a script, said script including calls to routines in a library, said calls being used to parse and interpret information included in said memory dump file.

9. The method of claim 8, wherein said common set of information includes a first portion obtained by making one or more calls to routines in a first standard library provided with said debugger, and a second portion obtained by making one or more calls to routines in a customized library.

10. The method of claim 9, wherein said customized library includes routines for interpreting data structures in accordance with a customized data format.

11. The method of claim 10, wherein said data structures describe entities and a state of said entities at a time of said previous failure of said processor.

12. The method of claim 11, wherein at least one of said entities is one of a physical or logical device of a data storage system including said processor.

13. The method of claim 7, further comprising:
performing subsequent analysis using information extracted from said memory dump file in accordance with said preliminary analysis, said subsequent analysis including performing diagnostic processing to identify potential causes of said previous failure in accordance with diagnostic signature information.

14. The method of claim 13, wherein at least one of said conditional processing and said subsequent analysis are performed in accordance with a configuration option setting.

15. A data storage system comprising:
a processor that executes instructions;
a debugger that executes at least one script for analyzing a memory dump file from a previous failure of the processor and generating a preliminary analysis file;
a dump manager that controls processing for analyzing the memory dump file from a previous failure of the processor, said dump manager invoking said debugger in connection with said analyzing;
a boot module including code executed to boot said processor, wherein said boot module automatically invokes said dump manager as part of booting said processor; and
at least one routine including code used to extract and interpret information from said memory dump file, said at least one routine being invoked by said debugger in accordance with said at least one script.

16. The data storage system of claim 15, wherein execution of a script by said debugger performs subsequent analysis in accordance with diagnostic signature information including profile information about known problems.

17. The data storage system of claim 15, further comprising:
a compression module that compresses said preliminary analysis file, said compression module being invoked by said dump manager.

18. The data storage system of claim 15, wherein said dump manager, said boot module, said at least one script, said at least one routine, and said dump manager are included in a same partition of storage of said data storage system.

19. A computer-readable medium storing instructions thereon for performing a method for processing a memory dump file comprising:
determining whether a memory dump file associated with a previous processor failure exists; and
in response to determining that the memory dump file exists, performing preliminary analysis of said memory dump file using a debugger, and
wherein said determining and said preliminary analysis are performed as part of rebooting a processor from the previous failure of the processor.

20. A computer-readable medium storing instructions thereon for performing a method for processing a memory dump file comprising:
determining whether a memory dump file associated with a previous processor failure exists; and
in response to determining that the memory dump file exists, performing preliminary analysis of said memory dump file, and
wherein said determining and said preliminary analysis are performed as part of rebooting a processor from the previous failure of the processor, and wherein said performing preliminary analysis further includes:
storing extracted information in a file having a human-readable form, said file having a size which is smaller than said memory dump file.

* * * * *